United States Patent
Wojsznis et al.

(10) Patent No.: US 7,317,953 B2
(45) Date of Patent: Jan. 8, 2008

(54) ADAPTIVE MULTIVARIABLE PROCESS CONTROLLER USING MODEL SWITCHING AND ATTRIBUTE INTERPOLATION

(75) Inventors: Wilhelm K. Wojsznis, Austin, TX (US); Terrence L. Blevins, Round Rock, TX (US); Mark J. Nixon, Round Rock, TX (US); Peter Wojsznis, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 193 days.

(21) Appl. No.: 11/002,158

(22) Filed: Dec. 2, 2004

(65) Prior Publication Data

US 2005/0149209 A1 Jul. 7, 2005

Related U.S. Application Data

(60) Provisional application No. 60/526,897, filed on Dec. 3, 2003.

(51) Int. Cl.
*G05B 13/02* (2006.01)
(52) U.S. Cl. .................. 700/28; 700/29; 700/30; 700/31
(58) Field of Classification Search .......... 700/28, 700/29, 30, 31, 53, 108, 173, 174
See application file for complete search history.

(56) References Cited

U.S. PATENT DOCUMENTS 4,358,822 A * 11/1982 Sanchez ............... 700/31

(Continued)

FOREIGN PATENT DOCUMENTS

EP 0 037 579 A3 10/1981

(Continued)

OTHER PUBLICATIONS

Search Report under Section 17(5) issued in GB0426501.3 application by United Kingdom Patent Office on Apr. 11, 2005.

(Continued)

*Primary Examiner*—Thomas K. Pham
(74) *Attorney, Agent, or Firm*—Marshall, Gerstein & Borun LLP

(57) ABSTRACT

An adaptive multivariable process control system includes a multivariable process controller, such as a model predictive controller, having a multivariable process model characterized as a set of two or more single-input, single-output (SISO) models and an adaptation system which adapts the multivariable process model. The adaptation system detects changes in process inputs sufficient to start an adaptation cycle and, when such changes are detected, collects process input and output data needed to perform model adaptation. The adaptation system next determines a subset of the SISO models within the multivariable process model which are to be adapted, based on, for example, a determination of which process inputs are most correlated with the error between the actual (measured) process output and the process output developed by the multivariable process model. The adaptation system then performs standard or known model switching and parameter interpolation techniques to adapt each of the selected SISO models. After the adaptation of one or more of the SISO models, the resulting multivariable process model is validated by determining if the adapted multivariable process model has lower modeling error than the current multivariable process model. If so, the adapted multivariable process model is used in the multivariable controller.

42 Claims, 3 Drawing Sheets

U.S. PATENT DOCUMENTS

| | | | |
|---|---|---|---|
| 4,641,235 A | | 2/1987 | Shigemasa et al. |
| 5,018,215 A | | 5/1991 | Nasr et al. |
| 5,043,863 A | * | 8/1991 | Bristol et al. ................. 700/45 |
| 5,159,547 A | | 10/1992 | Chand |
| 5,180,896 A | | 1/1993 | Gibby et al. |
| 5,272,621 A | | 12/1993 | Aoki et al. |
| 5,335,164 A | | 8/1994 | Gough, Jr. et al. |
| 5,453,925 A | | 9/1995 | Wojsznis et al. |
| 5,461,559 A | | 10/1995 | Heyob et al. |
| 5,568,378 A | | 10/1996 | Wojsznis |
| 5,587,899 A | | 12/1996 | Ho et al. |
| 5,625,552 A | | 4/1997 | Mathur et al. |
| 5,748,467 A | | 5/1998 | Qin et al. |
| 5,838,595 A | * | 11/1998 | Sullivan et al. ................. 703/2 |
| 6,041,320 A | | 3/2000 | Qin et al. |
| 6,049,738 A | | 4/2000 | Kayama et al. |
| 6,128,541 A | | 10/2000 | Junk |
| 6,249,712 B1 | | 6/2001 | Boiquaye |
| 6,330,484 B1 | | 12/2001 | Qin |
| 6,353,766 B1 | | 3/2002 | Weinzierl et al. |
| 6,445,962 B1 | | 9/2002 | Blevins et al. |
| 6,445,963 B1 | * | 9/2002 | Blevins et al. ................. 700/44 |
| 6,577,908 B1 | * | 6/2003 | Wojsznis et al. .............. 700/42 |
| 6,745,088 B2 | | 6/2004 | Gagne |
| 7,113,834 B2 | | 9/2006 | Wojsznis et al. |
| 2003/0120361 A1 | * | 6/2003 | Anderson et al. ............. 700/31 |
| 2003/0139825 A1 | * | 7/2003 | Lund ........................... 700/29 |

FOREIGN PATENT DOCUMENTS

| | | |
|---|---|---|
| EP | 0 643 344 A1 | 3/1995 |
| GB | 2 355 545 | 4/2001 |
| WO | WO-97/12300 | 4/1997 |
| WO | WO-00/33209 | 6/2000 |
| WO | WO-01 98845 | 12/2001 |

OTHER PUBLICATIONS

Astrom and Hagglund, "Industrial Adaptive Controllers Based on Frequency Response Techniques," Automatica, vol. 27, No. 4, pp. 599-609 (1991).

Astrom and Hagglund, "A Frequency Domain Method for Automatic Tuning of Simple Feedback Loops," 23$^{rd}$ Conference on Decision and Control, Las Vegas, pp. 299-304 (Dec. 1984).

Astrom and Hagglund, "PID Controllers: Theory, Design, and Tuning," ISA, 2$^{nd}$ Edition, Chapter 6, pp. 230-272 (1995).

De Persis, et al., "Further results on switched control of linear systems with constraints," Proceedings of the 41st IEEE Conference on Decision and Control, Las Vegas, NV, pp. 2810-2815 (Dec. 2002).

Examination Report under Section 18(3) issued by the United Kingdom Patent Office on Feb. 14, 2006, for GB Application No. 0408598.1.

Examination Report under Section 18(3) issued by the United Kingdom Patent Office on Feb. 27, 2007, for GB Application No. 0426501.3.

Gendron, S., "Simple Adaptive Digital Dead-time Compensators for Low-order SISO Processes," IFAC Identification and System Parameter Examination, Budapest, Hungary, pp. 1179-1184.

Gendron, S., "Improving the Robustness of Dead-time Compensators for Plants with Unknown or Varying Delay," Preprints of the Control Systems 90 Conference, Helsinki (1990).

"Getting Started with Your DeltaV™ Automation Software," Version 5, Fisher-Rosemount (2000).

Hanagud, S., Glass, B.J., and Calise, A.J., "Artificial Intelligence-Based Model-Adaptive Approach to Flexible Structure Control", American Institute of Aeronautics and Astronautics, Inc., vol. 13, No. 3, pp. 534-544 (May 1990).

Hespanha et al., "Overcoming the limitations of adaptive control by means of logic-based switching," Systems and Control Letters 49: 49-65 (2003).

Hespanha et al., "Stabilization of Nonholonomic Integrators via Logic-Based Switching," Automatica, pp. 385-394 (Mar. 1999).

Ho, et al., "Frequency Domain Approach to Self-tuning PID Control," Control Engineering Practice, vol. 4, No. 6, pp. 807-813.

International Search Report in PCT/US01/19706 dated Oct. 23, 2001.

Jadbabaie et al., "Coordination of Groups of Mobile Autonomous Agents Using Nearest Neighbor Rules," IEEE Transactions on Automatic Control, 48(6), pp. 988-1001 (Jun. 2003).

Liberzon et al., "Basic Problems in Stability and Design of Switched Systems," IEEE Control Systems Magazine, pp. 59-70 (Oct. 1999).

Liberzon et al., "Stability of switched systems: a Lie-algebraic condition," Systems and Control Letters, vol. 37, pp. 117-122 (Jun. 1999).

McMillan, et al, "Easy Tuner for DCS," ISA, pp. 703-710, Chicago (1993).

Morse et al., "Applications of Hysteresis Switching in Parameter Adaptive Control," IEEE Transactions on Automatic Control, 37(9), pp. 1343-1354 (Sep. 1992).

Morse, "A Bound for the Disturbance-to-Tracking—Error Gain of a Supervised Set-Point Control System," Springer-Verlag, New York (1998).

Morse, "Control Using Logic-Based Switching," in Trends in Control: A European Perspective, Alberto Isidori (ed.), Springer Verlag, New York (1995).

Morse, A.S., "Lectures on Control Using Logic and Switching," Center for Computation Vision and Control Department of Electrical Engineering, Yale University, pp. 1-2 (Abstract).

Narendra K.S., and Balakrishnan, J., "Adaptive ontrol Using Multiple Models," IEEE Transactions on Automatic Control, vol. 42, No. 2, pp. 171-187 (Feb. 1997).

Ott, et al., "Auto-Tuning: from Ziegler-Nichols to Model Based Rules," Proceedings of the ISA/95 Conference, New Orleans, pp. 323-332 (1995).

Pait et al., "A Cyclic Switching Strategy for Parameter-Adaptive Control," IEEE Transactions on Automatic Control, 39(6), pp. 1172-1183 (Jun. 1994).

Shinskey, F.G., "Process Control Systems: Application, Design and Tuning," 4$^{th}$ ed., Chapter 6, pp. 179-209, McGraw-Hill, New York (1996).

Wojsznis et al., "Adaptive Feedback/Feedforward PID Controller," ISA Conference, Houston (2003).

http://easydeltav.com/keytechnologies/index.asp.

http://brainwave.com.

http://ideas-simulation.com/content/ArchivesItem.phtml?art=160&c=0.

http://pas.com.

http://adaptiveresources.com.

http://www.emersonprocess.com/systems/index.html (formerly http://www.frsystems.com/DeltaV™).

\* cited by examiner

ADAPTIVE MULTIVARIABLE PROCESS CONTROLLER USING MODEL SWITCHING AND ATTRIBUTE INTERPOLATION

CROSS REFERENCE TO RELATED APPLICATIONS

This application is a regularly filed application of and claims priority to U.S. Provisional Application Ser. No. 60/526,897 filed on Dec. 3, 2003 and entitled "Adaptive Multivariable Process Controller Using Model Switching and Attribute Interpolation" and is related to U.S. patent application Ser. No. 10/419,582, filed on Apr. 21, 2003 and entitled "Adaptive Feedback/Feedforward PID Controller," which is a continuation-in-part of U.S. patent application Ser. No. 09/597,611 filed on Jun. 20, 2000, entitled "Adaptive Feedback/Feedforward PID Controller" and issued as U.S. Pat. No. 6,577,908 B1 on Jun. 10, 2003, the entire specifications of which are hereby explicitly incorporated by reference herein.

TECHNICAL FIELD

The disclosed method and apparatus generally relates to process control techniques and, more particularly, to an adaptive multivariable control technique that performs one or both of model switching and parameter interpolation during a model adaptation procedure.

DESCRIPTION OF THE RELATED ART

It is known in the art to use logic-based controller switching strategies to implement adaptive process control in automated systems such as, for example, large manufacturing plants, chemical refineries, etc. An exemplary discussion of logic-based switching strategies can be found in, for example, Morse, F. M. Pait, and S. R. Weller's, "Logic-Based Switching Strategies for Self-Adjusting Control, *IEEE 33rd Conference on Decision and Control* (December 1994). Generally speaking, logic-based controller-switching strategies may be categorized into one of two approaches, generally identified as a prerouted controller approach and an model-based parameterized controller approach.

Prerouted controller tuning, in principle, evaluates possible controllers contained in a predefined set of possible controllers. The evaluation is complete when a controller is identified that performs satisfactorily. Prerouted controller tuning systems are relatively simple to design and impose few requirements on controller structure. However, the advantages of prerouted controller tuning systems are overshadowed by intrinsically poor performance with respect to tuning time, i.e., an inordinate length of time is required to select the optimal controller from the predefined set.

Model-based, parameterized controllers generally consist of two or more parameter-dependent subsystems, a model which generates an output estimation error, and an internal controller. In operation, a control signal, based on an estimate of a suitably defined model set, is communicated to a process being controlled. Model-based, parameterized controllers embody a controller-switching strategy based on the concept of "cyclic switching," which can be employed with or without providing an additional excitation signal to the process.

A worthwhile discussion of the cyclic switching approach to process control adaptation may be found in K. S. Narendra and J. Balakrishnan's, "Adaptive Control Using Multiple Models," *IEEE Transactions on Automatic Control*, Vol. 42, No. 2, pp. 177-187 (February 1997). This article discloses a process control system including a controller characterized by a plurality of parameters and N models operating in parallel and having model parameters corresponding to the plurality of controller parameters. At any point in time, a single model and corresponding parameterized controller, is selected by a switching rule and the corresponding control input is used to control the process. The models may be fixed parametric models or may be adaptive parametric models, depending on the requirements of the process, the needs of the operator and any other appropriate considerations. Fixed parametric model control systems offer a simple and effective means of insuring the existence of at least one model characterized by parameters sufficiently close to those of the unknown process.

Cyclic switching based process control systems using fixed parametric models provide for rapid adaptation speeds, but require the design and storage of a significant number of models within the process controller. It should be noted that fixed models are capable of precisely representing only a finite number of process environments or conditions, and to asymptotically improve process accuracy, an adaptive model must be employed.

Practically speaking, model based switching strategies pose a number of problems due to the significant number of models required for a reasonable process approximation. For example, a simple single-input, single-output (SISO) system, including a fixed model based self-tuner can be reasonably expected to include hundreds of fixed models to achieve satisfactory process performance. Thus, as systems become more complex, e.g. multivariable systems, the required number of customized, fixed models increases exponentially, thereby increasing the system setup time and system storage requirements. More effective solutions require consideration of the specific process model structure and controller type, and suggest the replacement of simple switching strategies with more elaborate procedures.

A modified model-based approach for a Dahlin controller has been offered by Gendron in the text, "Improving the Robustness of Dead-Time Compensators for Plants with Unknown or Varying Delay," *Control Systems 90 Conference* (Helsinki 1990). This document discloses a simple first-order-plus-dead-time process model for providing process adaptation based on dead time variation. Rather than relying on simple model switching, the controller utilizes a process model based on the weighted sum of a set of models characterized by disparate dead times. Each of the models in the set generates a prediction of the process output, and the corresponding weight is adjusted automatically as a simple function of the prediction error. The basic concept has been extended to include process gain and dead time variation within the Dahlin controller construct.

In general, the prevalent approaches for designing an adaptive PID adaptive controller are, the direct approach, and the indirect, or model-based, approach. As discussed above, the model-based approach is effective for control systems utilizing switching strategies and provides an appropriate starting place from which to design an adaptive switching PID controller. It is known to provide a model identification-based, adaptive PID controller coupled with a Recursive Least Squares (RLS) estimator that tracks changes in the model parameters. Typical problems associated with recursive model identifiers include difficulty selecting initial parameters, insufficient excitation, filtering, parameter wind-up, and sluggish parameter tracking speed. Because of the complexity of these variables and the difficulty associated with calculating accurate estimates, it is well understood in the art that the performance of the known model-based, adaptive PID controller may be improved by simplifying the process model.

An exemplary explanation of a simplified model-based adaptive controller is described by Astrom and Hagglund in "Industrial Adaptive Controllers Based on Frequency Response Techniques," *Automatica*, Vol. 27, No. 4, pp. 599-609 (1991). Generally, this article discloses a controller designed to perform process model adaptation in the frequency domain, and tuning in response to set point changes and natural disturbances. More specifically, a tuning frequency is selected by applying band-pass filters to the process input and output, wherein the pass-band frequency of the filters is defined by the auto-tuner (tuner-on-demand). The auto-tuner defines the ultimate period using a relay oscillation technique, prior to adaptive tuner operation, and defines the process gain for the tuning frequency using a simplified RLS estimator. The auto-tuner has the capability to track changes in a process gain. However, when a change in a dead time or in a time constant is encountered, the point tracked no longer exhibits a $-\pi$ phase, and controller tuning becomes inaccurate.

Further, it is known to improve tuning by applying several tuning frequencies and using an interpolator to define a frequency with phase $-\pi$. Alternatively, it is possible to apply a single tuning frequency and to adjust frequencies after each tuning cycle to track a phase $-\pi$. Both tuner models accommodate subsequent set point changes and natural disturbances and may inject external excitations at the controller output or at the set point input. Although such auto-tuners do not exhibit the size and set-up constraints of the previous technique, they are significantly more complex.

Furthermore, both of these tuner models utilize primitive adaptive models that recognize only two parameters, namely, ultimate gain and ultimate period. Tuner models incorporating these simple, two-parameter, adaptive models are suitable for Ziegler-Nichols tuning or some analogous modification, but are unsuitable for applications where Internal Model Control (IMC) or Lambda tuning is preferred. While a simple RLS identifier may be used to determine static gain for the feedforward control, the RLS identifier approach does not provide the process feedforward dynamics required for adequate feedforward control. In addition, because feedforward signals are load disturbances, and perturbation signals cannot be injected into the feedback path, the approach suffers the problem of insufficient excitations.

An alternate solution to feedforward adaptation was disclosed by Bristol and Hansen in U.S. Pat. No. 5,043,863, entitled "Multivariable Adaptive Feedforward Controller." This patent discloses a differential equation based process model designed to include load disturbances. The process model is periodically updated based on measured process data, wherein disturbances are characterized by moment relations and control relations that are achieved by projection methods. In general, the derived solution is very complex and requires significant excitations, much the same as the above-described RLS identifier approach. Moreover, the derived solution is suitable only for feedforward control and is inapplicable to an adaptive controller with feedback.

U.S. Pat. No. 6,577,908 discloses a substantially modified and enhanced adaptive switching procedure that introduces a parameter interpolation and model re-centering technique, instead of model interpolation, which makes it possible to dramatically reduce the number of models used for adaptation. The controller disclosed in this patent features shorter adaptation time, complete process model identification, and reduced requirements for process excitation.

While suitable for simple process models, the model and parameter adaptation and switching techniques discussed above have here-to-for been limited for use in adapting single-input, single-output (SISO) controller systems and have not been applied to multivariable control situations, i.e., ones in which a controller provides simultaneous control of two or more variables based on one or more inputs. However, multivariable control, and in particular, model predictive control (MPC) which is one specific type of multivariable control, has rapidly become a useful control strategy for complex control situations. It is desirable, therefore, to provide an adaptation strategy that can be applied to multivariable controllers to enable these controllers to adapt during runtime, to thereby better react to changes in a process, set points, etc., so as to provide better control.

SUMMARY

An adaptive multivariable process control system, such as an adaptive MPC process control system, includes a multivariable process controller having a process model made up of or characterized as a set of two or more SISO models and an adaptation system which adapts the multivariable process model. Generally speaking, the adaptation system includes a supervisor that detects changes in process inputs sufficient to start an adaptation cycle and, when such changes are detected, collects process input and output data needed to perform adaptation. Next, the supervisor may determine a subset of the SISO models within the multivariable process model which should be adapted, to thereby adapt the multivariable process model. Such a selection of SISO models may be made by determining which process inputs are most correlated with the error between the actual (measured) process output and the process output developed by the multivariable process model for each process output, and selecting the SISO models which relate the highly correlated inputs to the process outputs experiencing modeling error. If desired, only the SISO models associated with inputs that experience a predetermined amount of change may be selected for adaptation.

The adaptation system then performs standard or known model switching and parameter interpolation techniques to adapt each of the selected SISO models. After the adaptation of one or more of the SISO models, the resulting multivariable process model is validated by determining if the adapted multivariable process model (i.e., the process model including both the adapted and the unadapted SISO models) operates on the same process input and output data to provide better control than the current or unadapted multivariable process model and/or reduces the modeling error by a predetermined amount. If the adapted multivariable process model performs better than the current multivariable process model, the adapted multivariable process model (or the adapted SISO models associated therewith) is transformed into a form used by the multivariable controller and is then provided for use in the multivariable process control system to control the process.

Of course, the adaptation procedure can be repeated as necessary or as desired, such as after each detected change in a process input or output of a sufficient amount, after a forced change in a process input or output, etc. Still further, any desired number of SISO models can be adapted during any particular adaptation procedure to thereby enable the speed of the adaptation procedure to be altered depending on the complexity of the process and the computing requirements which have to be met.

The multivariable adaptation procedure described herein can be applied using both parameter based SISO models, such as first-order-plus-dead-time models, or using non-parametric type models, such as step or impulse response models. In the latter case, the adaptation procedure may use model switching and model attribute interpolation (of which model parameter interpolation is a subset) to develop or adapt each of the selected process models. In this case, instead of altering or varying one or more parameters of a parameter based model, such as the gain, time constant and dead time of a model, an attribute of the non-parametric model, such as the time until a response is first observed, the scaling, a slope, etc. of the non-parametric model may be altered and the interpolation may be performed based on these attribute alterations to determine the new or adapted non-parametric model.

DETAILED DESCRIPTION

Figure 1:
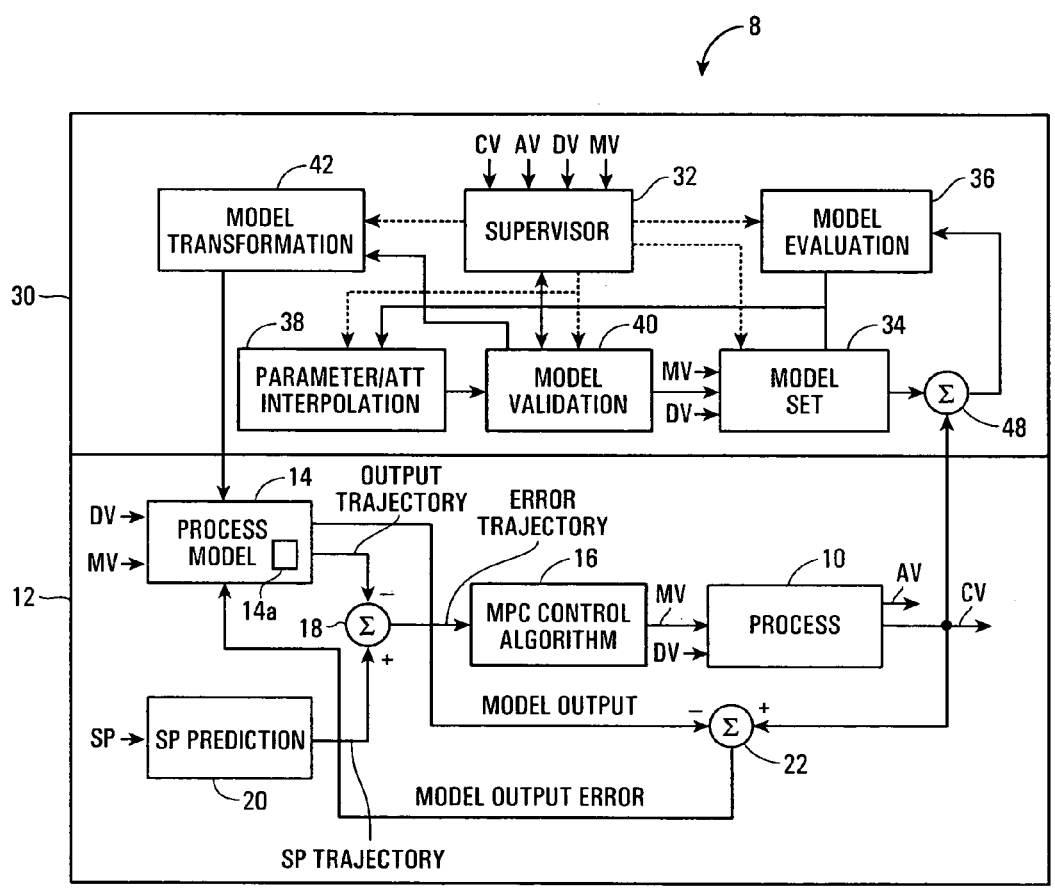
FIG. 1 is a functional block diagram of an adaptive multivariable control system, the operation which is based on interpolation of process model parameters or attributes.

FIG. 1 illustrates an exemplary adaptive multivariable process control system 8 that uses model predictive control (MPC) to provide multivariable control in a process 10. The control system 8 is somewhat similar in design to the feedback/feedforward (FB/FC) PID control system disclosed in U.S. Pat. No. 6,577,908, the disclosure of which is hereby expressly incorporated by reference herein. In fact, the control system 8 may use components of the PID control system disclosed in U.S. Pat. No. 6,577,908, as will be discussed in more detail herein.

As illustrated in FIG. 1, the adaptive multivariable control system 8 includes a standard or typical MPC system 12 having a process model block 14 coupled to an MPC controller 16 which produces manipulated variable (MV) signals used to control the process 10. Generally speaking, the process model block 14 includes a multivariable process model 14a which may be made up of a set of single input-single output (SISO) models, each of which may be a parametric model, such as a first-order-plus-dead-time model, or a non-parametric model, such as a step response curve. Each of the SISO models defines a relationship between or a response of one of the process outputs, also called controlled variables (CVs) or auxiliary variables (AVs), to one of the process inputs, i.e., the MVs developed by the MPC controller 16 and measured disturbance variables (DVs). During operation, the process model block 14 receives the MVs and the measured DVs and uses the multivariable process model 14a therein to produce a predicted or future output trajectory signal defining the predicted future response (the future CVs and AVs) of the process 10. This predicted output trajectory signal is delivered to a vector summer 18.

The MPC control system 12 also includes a set point prediction unit or block 20 which receives process set point signals SP, which may include a separate set point signal for each of one or more of the process outputs (CVs and AVs) and which produces a set point trajectory signal defining predicted future set points. The SP prediction unit 20 may, for example, be connected to an optimizer (not shown) which provides indications of future set point changes for the process 10. The set point trajectory signal developed by the SP prediction unit 20 is also provided to the vector summer 18, which computes an error trajectory signal defining the difference between the predicted process output trajectory and the predicted set point trajectory signals. This error trajectory signal is provided to an input of the MPC controller 16, which uses the error trajectory signal in known manners to produce the manipulated variables (MVs) which are, in turn, provided to inputs of the process 10 to thereby control the process 10.

As is typical, outputs of the process 10, including control variables (CVs) and, if desired, auxiliary variables (AVs), are provided back to a summer 22 where they are combined with predicted model outputs for the same time (as produced by the multivariable process model 14a) to develop a current model output error. This model output error is then delivered back to the process model block 14 where it is used, in a standard manner, to correct the predicted outputs of the process model block 14.

As will be understood, the MPC control system 12 is typical and is well known in the art. As such, it is well within the knowledge of those skilled in the art to produce or modify the MPC control system 12 in known manners to provide MPC or other multivariable control of the process 10. Still further, while the adaptation technique described herein is used in the context of an MPC controller, it could be used as well in other model based, multivariable process control systems.

Referring again to FIG. 1, a model adaptation network 30 may be used to adapt the multivariable process model 14a used in the MPC control system 12 using model switching and/or parameter (or model attribute) interpolation techniques which, before this time, were limited to use in single-input, single-output (SISO) model based control systems.

As illustrated in FIG. 1, the model adaptation network 30 includes a supervisor 32, which generally controls the adaptation process, a model set block 34, which generally stores a set of different potential models that can be evaluated for use in the multivariable process model 14a, and a model evaluation block 36 which evaluates the models in the model set block 34 to determine model parameter or attribute weighting to be used in the adaptation process. The model adaptation network 30 also includes a parameter/attribute interpolation block 38 which determines the values of model parameters or attributes to be used in components of the multivariable process model 14a, a model validation block 40 which may be used to validate the operation of a new multivariable process model when adapted, but prior to substituting that new model into the process model block 14, and a model transformation block 42 which transforms a new or adapted process model into the form used by the process model block 14 for use in the MPC control system 12.

Figure 2:
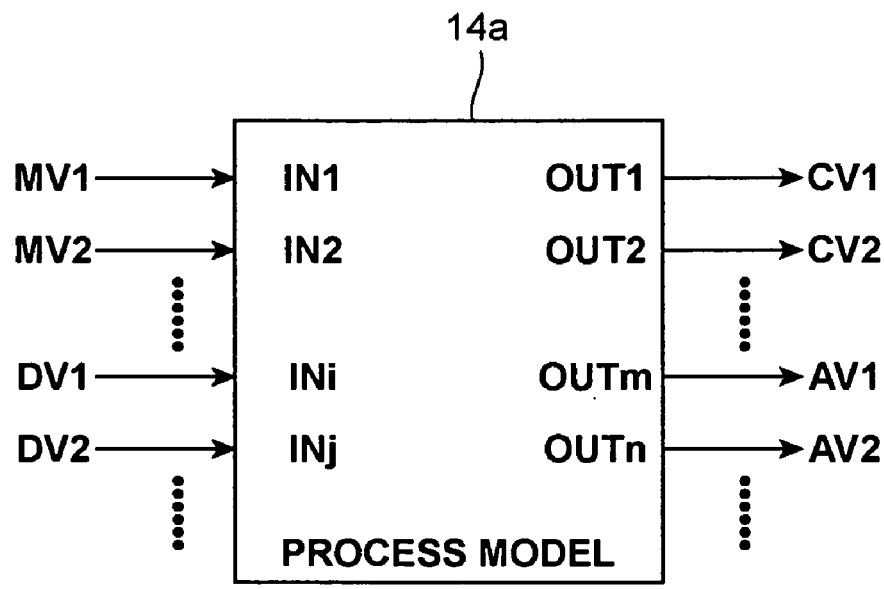
FIG. 2 is a conceptual depiction of a multiple-input, multiple-output process controller.

The operation of the adaptation network 30 will be best understood by first describing the manner in which the multivariable process model 14a within the block 14 operates to model the process 10 in a typical MPC application. To that end, FIG. 2 illustrates a generalized form of the multivariable process model 14a which has multiple inputs $IN_i$ (for i=1 to j) and multiple outputs $OUT_i$ (for i=1 to n). The inputs $IN_i$ may be manipulated variables ($MV_1$, $MV_2$, etc.) and measured disturbance variables ($DV_1$, $DV_2$, etc.) while the outputs $OUT_i$ may be predicted values of controlled variables ($CV_1$, $CV_2$, etc.) and auxiliary variables ($AV_1$, $AV_2$, etc.)

One technique of modeling the manner in which the various input signals $IN_i$ (for i=1 to j) effect or produce the predicted output signals $OUT_i$ (for i=1 to n) is to first define a different single-input, single-output (SISO) model for each input/output pair, relating the response of each output signal $OUT_i$ to each of the input signals INi. Thus, in the process model of FIG. 2, there will be j times n SISO models, with each SISO model defining the response of one of the outputs $OUT_i$ to one and only one of the input signals $IN_j$. As used herein, the SISO models are referred to as Model(In,Out), wherein the variable "In" ranges from 1 to j (the total number of inputs) and wherein the variable "Out" ranges from 1 to n (the total number of outputs). Thus, the SISO model defining the response over time of the output signal $OUT_2$ to the input signal $IN_3$ will be Model(3,2).

Figure 3:
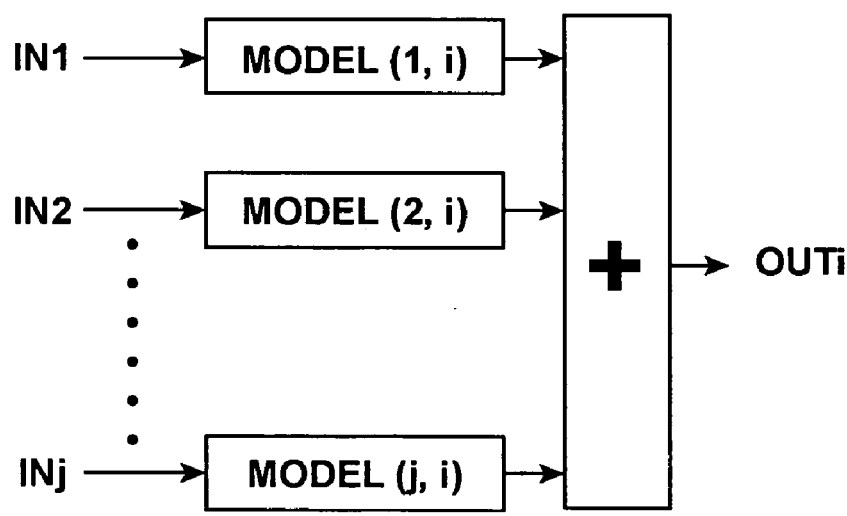
FIG. 3 is a conceptual depiction of a manner in which a set of single-input, single-output models can be used to develop the outputs of a multiple-input, multiple-output process model.

Next, as illustrated in FIG. 3, a particular output signal $OUT_i$ can be determined as the sum of the outputs of each of the SISO models Model(In,i) for In =1 to j. In other words, one approach in modeling multi-variable linear processes assumes that a process output is the superposition (summation) of the SISO model outputs that define the relationship between each of the process inputs and that process output. As will be understood, all of the process outputs $OUT_i$ (for i=1 to n) can be modeled in this manner, it being understood that each of the $OUT_i$ signals and each of the $IN_i$ signals may be time dependent signals defining the relationship over a particular period of time, such as a time to steady state. As a result, the output of the multivariable process model block 14 of FIG. 1 defines a trajectory signal or a vector defining the values of each of the OUT signals over a range of times.

Generally speaking, the SISO models Model(In,Out) depicted in FIG. 3 may be parameter-based or parametric models, such as first-order-plus-dead-time models (or any other parametric models) or may be non-parametric models, such as step response models, which define the value of an output signal over time in response to a change in the associated input signal. Of course, other types of parametric models and non-parametric models (e.g., impulse models, ramp models, etc.) could be used as well or instead of those discussed herein.

Referring again to FIG. 1, the adaptation system 30 operates to adapt one or more of the SISO models used in the multivariable process model 14a to produce a new multivariable process model to be used in the MPC controller system 12. Generally speaking, during each adaptation cycle or scan, the adaptation system 30 first determines which, in any, of the SISO models should be adapted based on the contribution that each of the SISO models makes to the error between the predicted process output (as developed by the multivariable process model 14a) and the actual (or measured) output of the process 10. The adaptation system 30 then, using the model set 34, the model evaluation block 36 and the parameter/attribute interpolation block 38, performs process modeling centering on each SISO model identified for adaptation. This model centering may be accomplished in the form of a model parameter or attribute interpolation technique which determines the manner in which each of the identified SISO models should be modified or changed. The adaptation system 30 may, during or at the end of this procedure, validate the newly adapted SISO models using the model validation block 40 to assure that the adapted SISO models (and therefore the adapted multivariable process model resulting from the combination of the adapted SISO models) performs better than the multivariable process model 14a currently being used by the MPC control system 12.

When the new or adapted multivariable process model or one or more of the SISO models making up the multivariable process model has/have been validated as providing smaller modeling error than the current multivariable process model 14a used within the process model block 14, the model transformation block 42 transforms the adapted multivariable process model or the adapted SISO models making up the adapted multivariable process model into a form that may be used by the process model block 14. Thus, for example, the model transformation block 42 may transform a parametric type SISO model into a step response model and provide the step response model to the process model block 14 for use in the MPC control system 12.

During operation of the process 10, the supervisor 32 of FIG. 1 receives indications of each of the CV, AV, DV and MV signals and operates to detect changes on the process outputs (CVs and AVs), on the process inputs (MVs) and on the disturbance inputs (DVs). If a change on any process inputs (such as the MVs or the DVs) exceeds a minimum level, the supervisor 32 begins a model evaluation procedure to determine if any of the SISO models associated with the multivariable process model 14a needs to be adapted. Detected changes can be instantaneous, i.e., over one scan period or may be gradual and detected over a predetermined period of time (or number of controller scans). In fact, in multivariable processes, changes usually happen on several inputs and outputs at the same time, which is ideal for operation of the adaptation procedure described herein.

After detecting one or more changes of a predetermined amount in the process inputs (which amount may, if desired, vary based on the signal being monitored), the supervisor 32 collects and stores process input and output data for a particular period of time, such as, for example, a time to steady state. If the detected change leading to the initiation of the adaptation procedure is gradual in nature, that is, occurring over multiple scans, the supervisor 32 may need to collect the input and output data associated with the beginning of the change, even if the change has not yet reached the predetermined amount needed to begin the adaptation procedure, so as to have the data needed to analyze the operation of the adapted multivariable process model during the adaptation procedure.

In any event, after the process input and output data has been collected and stored in a memory (not shown explicitly in FIG. 1), the supervisor 32 may next evaluate the error between the current process model 14a as used in the process model block 14 and the actual measured outputs of the process 10 based on the measured or collected inputs to the process 10, to determine which, if any, of the SISO models within the multivariable process model 14a need to be adapted. Thus, while every SISO model may be adapted during any particular adaptation process, this may not be necessary and, in fact, may lead to long adaptation cycles. Instead, the supervisor 32 may first determine a subset of the SISO models to which the adaptation procedure discussed below is to be applied, with this subset being less than all of the SISO models within the process model 14a. Thus, the multivariable process model (which is a combination of all of the SISO models used in the process model block 14) may be adapted in full or only partially. Partial adaptation is advantageous when the modeling error on certain outputs is insignificant, when there is no correlation between the modeling error on a particular output and one or more of the process inputs, or when the changes in some process inputs are insignificant. These conditions are typical in MPC controlled processes and, thus, partial adaptation, i.e., adaptation of less than all of the SISO models, during a particular adaptation cycle or procedure may be common.

To perform the SISO model selection, the multivariable adaptation procedure may implement a model selection procedure that first defines the adaptive model configuration, i.e. the portions of the multivariable model (e.g., the particular SISO models) which are to be adapted. This model selection procedure may include calculating the model output error for every output $OUT_i$ at each scan during the period in which the input and output data was collected. In fact, this error is typically calculated in a normal MPC controller as the model output "shift" and is used for adjusting the model output dependent on process measurements. In any event, this error may be calculated as:

$$e^j(t) = y^j(t) - \hat{y}^j(t)$$

wherein:
  $e^j(t)$ is the model output error at the time t;
  $y^i(t)$ is the measured output of the process at the time t; and
  $\hat{y}^i(t)$ is the predicted process output at the time t as developed by the multivariable process model.

Next, the cross-correlation $r^N(\tau)$ between the error $e^j(t)$ and every process input $u^j(t)$ may be calculated using, for example, the equation:

$$r^N(\tau) = \frac{1}{N} \sum_{t=1}^{N} u(t-\tau)\varepsilon(t)$$

wherein:
  N is approximately to the number of samples collected in the period-defined by the time to steady state; and
  $\tau \approx \theta + 0.5\tau_c$, which is approximately the model dead-time plus half of the model time constant. This value is, in essence, the approximate time shift between an input and an output at which the output is the most sensitive to a change of the input and at which, therefore, the correlation function is at a maximum.

Now, for the j SISO models associated with every output $OUT_j$, the model or models associated with the inputs having the highest cross-correlation with respect to the output error may be selected as candidates for adaptation. If desired, the SISO model associated with the input having the highest or greatest cross-correlation may be selected as a candidate for adaptation, each SISO model having a cross-correlation value over a predetermined amount may be selected as a candidate for adaptation, or SISO models may be selected as candidates for adaptation based on other cross-correlation criteria.

While any particular SISO model may be selected as a candidate for adaptation, all of the selected SISO models may not actually be best suited for adaptation. In particular, if the input associated with a particular SISO model has not changed a significant or at least a minimal amount over the adaptation period, this model may not be a good candidate for adaptation even if the cross-correlation value is high because, in essence, the change in the input is not significant enough to rely on the cross-correlation calculation as an indicator that the SISO model plays a larger role in the output error than the SISO models associated with other inputs which have changed a significant amount but which have lower cross-correlation values. Thus, the input change for the selected model should satisfy condition:

$$\max_i(\text{Input}(i)) - \min_i(\text{Input}(i)) \geq \Delta.$$

If changes in normal operational data are small, the MPC controller 12 may inject a step pulse on a selected process input or a set point change can be made on a selected process output to force changes in the inputs over the predetermined amount to thereby create a condition in which adaptation can occur. If an optimizer is active, the optimizer should automatically bring the process output back to the original (optimal) value after such a step pulse is provided to an input. Conversely, if the MPC controller has no optimizer, the MPC controller may automatically set the input back in the original position after some period of time (pulse duration). The optimal pulse duration for the inputs and outputs was identified heuristically as being approximately equal to the dominant lag time for the considered output.

In any event, the supervisor 32 may determine whether the input associated with each identified SISO model has changed a predetermined or minimum amount over the adaptation period (the data collection period). If the input has not changed the predetermined amount, the SISO model is not selected as a model to be actually adapted. In this case, if desired, the SISO model associated with the input having the next highest cross-correlation with the output may be selected and the input of that model may be checked to determine if that input has changed a predetermined or minimal amount. This process may be continued for each input for a particular output to determine at least one SISO model to be adapted for that output. However, in some cases, no SISO models for a particular output may ultimately be determined as being models which should be adapted, because each of the inputs has a low cross-correlation with the output error for that output, because each SISO model is associated with an input that did not change enough during the adaptation period (e.g., the data collection period) or because of a low output error calculation in the first place.

When at least one SISO model for a particular output $OUT_j$ has been determined as needing to be adapted, the other SISO models not selected for the adaptation for that output $OUT_j$ are analyzed to calculate the contribution of these non-selected models to the model process output. This contribution is then subtracted from the process output measurement data to obtain the portion of the output measurement data that is actually associated with (or that results from) the SISO model or models being adapted. This procedure enables the adaptation system 30 to isolate the expected contribution of a particular SISO model to the actual process output so as to be able to identify the error between the expected contribution and the actual contribution (output) produced by the model being adapted.

It will be understood that the SISO model adaptation selection process is repeated or performed separately for every process output so that, generally speaking (although not necessarily always), at least one SISO model is selected for adaptation for each and every output $OUT_i$ of the process 10.

After one or more SISO models have been determined as being models which should be adapted, the adaptation system 30 may apply any known or desired adaptation procedure to those SISO models, either serially or in parallel. In one embodiment, the model adaptation procedure described in U.S. Pat. No. 6,577,908 may be applied for each SISO model selected to be adapted. Alternatively, the model adaptation process described in U.S. patent application Ser. No. 10/419,582, the disclosure of which is hereby expressly incorporated herein by reference may be used to perform SISO model adaptation.

While not repeating these procedures here, generally speaking, these adaptation procedures define a model set for the model to be adapted, with this model set being stored in the model set block 34 of FIG. 1. When the model is a parametric model, the model set 34 may include separate sub-models, with each sub-model having different values of the parameters associated with the model. Thus, if a model has three parameters, and each parameter can take on three possible values, the model set includes, in essence, 27 different sub-models. These sub-models may each be analyzed using the collected data to determine which parameter values for each of the parameters are associated with the lowest error in comparison to the actual output of the process 10. This error determination procedure is illustrated in FIG. 1 as being performed by a summer 48 which determines the difference between the output of a particular model within the model set 34 and the actual output of the process 10. While the connections to the summer 48 shown in FIG. 1 illustrate that the comparison between the output of the model set 34 and the process 10 is performed in real time, these comparisons may actually be (and will typically be) performed based on the process input and output data previously collected and stored by the supervisor 32 at the beginning of the adaptation procedure.

As will be understood from U.S. Pat. No. 6,577,908, a set of models for the SISO model being adapted is established including a plurality of model subsets which may be automatically selected by any desired pre-defined switching rule. Each of the individual models may include a plurality of parameters, each parameter having a respective value that is selected from a set of predetermined initialization values corresponding to the parameter. Evaluation of the individual models in the model set 34 includes the computation of a model-squared error, or norm. The norm is assigned to every parameter represented in the model that is evaluated. As repeated evaluations of models are conducted, an accumulated norm, which is the sum of all norms that have been assigned to the parameter in the course of model evaluations, is calculated for each parameter. Subsequently, an adaptive parameter value, which is a weighted average of the initialization values assigned to the respective parameters, may be calculated for each parameter.

As described in U.S. patent application Ser. No. 10/419, 582, the model set component may also include a state variable defining a plurality of process regions and a plurality of process models grouped into the plurality of process regions. In this case, each of the process models may also include a plurality of parameters each having a value selected from a set of predetermined initial values assigned to the respective parameter. Each of the regions may include a (different) set of standard parameter values defined for that region. In this case, the model evaluation block 36 analyzes the model error signal representative of the difference between the output of the process model within the model set 34 and the output of the process 10 and may compute a model squared error corresponding to the process model for attributing the model squared error to parameter values represented in the model. The parameter/attribute interpolator 38 is communicatively coupled to the model evaluation block 36 and calculates an adaptive process parameter value (or model attribute) for parameters (or attributes) represented in the process model.

In either case, as will be understood, the model evaluation block 36 determines weights for each of the parameters (or other attributes) within the model of the model set that results in the lowest error. As generally described in U.S. Pat. No. 6,577,908, these weights may be calculated based on the contributions to the error produced by each of the different possible parameter values. Additionally, as described in U.S. Pat. No. 6,577,908, the calculated parameters may define a new model set with center parameter values $p^k(a)$ (for k=1, . . . m) and the range of parameter changes as assumed in the design. The range of changes may be conveniently defined as plus and minus a $\Delta\%$. Within that range, two parameters at a minimum should be defined. Practically, two additional parameters $p^k(a)+\Delta\% \, p^k(a)/100$, and $p^k(a) \, \Delta\% \, p^k(a)/100$ may be defined around the parameter $p^k(a)$. Every parameter has defined lower and upper limits for adaptation and if a parameter $p^k(a)$ exceeds the limit, it is clamped to the limit. Of course, each model is preferably represented by a minimum number of parameters. It has been determined that first-order-plus-dead-time process models are adequate for modeling many processes using this technique.

After the weights for the parameters are determined by the model evaluation block 36, the parameter/attribute interpolation block 38 operates to define a new or adapted process model having parameter values developed using the parameter weights determined by the model evaluation block 36.

After adaptation of all selected SISO models for a specific process output, the next process output is selected and the procedure is repeated until parameter interpolation is performed for each SISO model selected to be adapted. Thereafter, the multivariable model made up of the adapted and non-adapted SISO models may be validated separately for every output. The model validation block 40 performs the validation procedure and either accepts or rejects the adaptation results. If desired, a two level criteria may be set to determine whether the adapted multivariable process model should be accepted. In this case, the output error in the adapted model should be less than a predefined value and the output error in the adapted model should be less than the output error in the current model. As will be understood, the same data set should be used in analyzing the current model and the adapted model.

After a multivariable model is validated and accepted, the model transformation block 42 may, if necessary, transform the adapted model into a form actually used by the MPC controller. Thus, a parametric model should be transformed to a step response model if the MPC controller uses step response models (as is typical in MPC controllers). Alternatively, step response models may be transformed to parametric models if the MPC controller uses a parametric model. Of course, the transformed model is then used to replace the current multivariable process model 14*a* used in the process model block 14. In this case, the entire multivariable process model 14*a* may be replaced, or only the SISO models that were actually adapted during the adaptation procedure may be replaced in the process model block 14.

Figure 4:
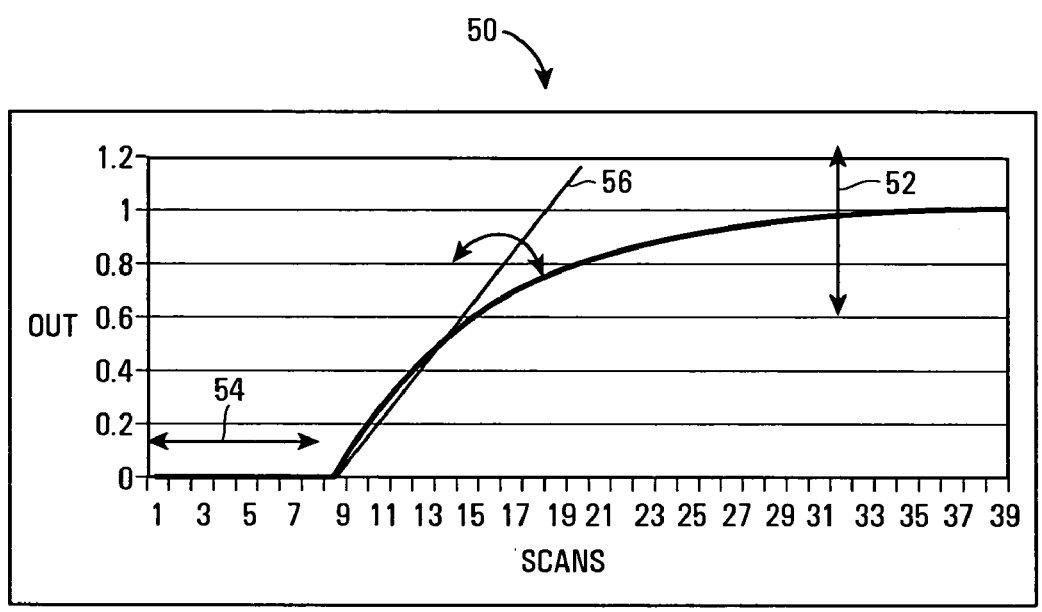
FIG. 4 is a graph illustrating the manner in which a non-parametric model, such as a step response model, can be adapted using model attribute interpolation techniques.

While the multivariable process model adaptation process has been described above and the SISO model adaptation process used therein and described in U.S. Pat. No. 6,577, 908 have been described as using parametric models in which parameter interpolation is performed, it is also possible to use and to adapt SISO models in the form of non-parametric models, such as step response models, using the techniques described herein. FIG. 4 illustrates a non-parametric step response model 50 which serves as an example of the manner in which SISO model adaptation may be performed on non-parametric models. In particular, instead of analyzing a parametric model by changing the value of one or more model parameters by a predetermined amount, model attributes associated with a non-parametric model may be modified in predetermined ways to define different non-parametric models for consideration in the adaptation process.

Thus, with respect to the step response model 50 of FIG. 4, different models to be considered in the model set 34 (FIG. 1) may be defined by altering certain aspects or attributes of the step response curve of FIG. 4 over a portion of the curve or over the entire curve. In one example, two additional step responses may be defined by increasing or decreasing step coefficients by an equal fraction at every step response coefficient, as illustrated by the line 52 of FIG. 4. This change, which is a change to the scaling of the step response curve, is analogous to changing the gain of a first-order-plus-dead-time parametric model. Similarly the time at which a response in the output is first seen within the step response of FIG. 4 can be moved left or right in time, as indicated by the line 54 of FIG. 4. This model attribute alteration is analogous to changing (increasing or decreasing) the dead time of a first-order-plus-dead-time parametric model. Additionally, the step apparent lag can be modified by moving step response values right or left of the values as defined by the line swinging around the point where step response rises. That is, the slope of the response curve can be altered (by increasing or decreasing the slope) to define step responses with varying lag or response times, as is illustrated by the line 56 of FIG. 4. This modification is analogous to increasing or decreasing the time constant of a first-order-plus-dead-time parametric model.

The advantage of this approach is that it enables modification and adaptation of more complex SISO models that may not be able to be expressed parametrically, thereby enabling adaptation of a multivariable process model that uses non-parametric models or other complex process models. Of course, while three specific changes to attributes of a step response curve have been illustrated herein, other changes to other attributes of a step response curve and the same or different changes to attributes of other non-parametric models may be applied as well to thereby define different models for consideration in the adaptation process described herein. Still further, it will be understood that, when non-parametric SISO model adaptation is performed using attribute modification as discussed herein, the adaptation system 30 of FIG. 1 interpolates between attribute settings instead of parameter settings to perform the model adaptation. As a result, the model set 34 may store and switch between two or more different attribute values when performing adaptation on non-parametric models in the same manner that the model set 34 stores and switches between preset parameter values for parametric SISO models.

Although the invention has been described with reference to the specific exemplary embodiments intended to instruct and illustrate the invention, the disclosed adaptive multivariable controller is not limited to those embodiments. Various modifications, improvements and additions may be implemented by those with skill in the art, and such modifications, improvements, and additions will not depart from the scope of the invention.

For example, as described above, controller adaptation is predicated on statistical interpolation of parameters or attributes used to construct a mathematical model of the process under control. Although the process is characterized by three parameters or attributes, and each of those parameters may be assigned three values, the disclosed adaptive multivariable controller clearly extends to other, and/or a different number of, parameters (or attributes), each potentially encompassing a different number of assigned values. Moreover, if desired, the parameter/attribute interpolator 38 may interpolate between a subset of the parameters (or attributes) such as between two of the parameters with the smallest associated error instead of interpolating between all of the parameters or attributes based on the parameter or attribute weights defined by the model evaluation block 36. This may decrease the interpolation time and the number of computations associated with each SISO model adaptation.

Likewise, the adaptation system 30 may operate to adapt based on all or only some of the parameters of a parametric model or based on all or only some of the attributes of a non-parametric model. In particular, the adaptation system 30 may focus on one or more "important" parameters or attributes present in any particular model (within the model set 34) without adapting or changing one or more of the other parameters or attributes during the adaptation procedure. This parameter or attribute selection technique can significantly reduce the time it takes the adaptation system 30 to adapt a particular SISO model, which may be important in multivariable processes having a significant number of SISO models which need to be adapted.

In addition, the model evaluation and parameter interpolation have been illustrated as individual components identified as the model set 24, the model evaluation block 36, the supervisor 32, the parameter/attribute interpolator 38, the model validation block 40 and the model transformation block 42. Those skilled in the art will understand that the partitioning of individual components is discretionary to those responsible for controller implementation and operation and that all of these functions can be implemented in any desired manner. Moreover, while the adaptive multivariable process control system described herein is preferably implemented in software, it or any portions thereof may be implemented in hardware, firmware, etc., and may be implemented by any other processor associated with a process control system. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a CD, a DVD, etc.) or other storage medium, in a RAM or ROM of a computer or processor, in any database, etc. Likewise, this software may be delivered to a user or a process plant via any known or desired delivery method including, for example, on a computer readable disk, smart card memories, or other transportable computer storage mechanism or over a communication channel such as a telephone line, the internet, etc. (which are viewed as being the same as or interchangeable with providing such software via a transportable storage medium).

It is also recognized that the specific approaches described herein represent but insubstantial deviations from the embodiments of the invention described above. Consequently, the claims are properly construed to embrace all modifications, variations and improvements that fall within the true spirit and scope of the invention, as well as substantial equivalents thereof. Accordingly, other embodiments of the invention, although not described with particularly herein, are nonetheless comprehended with the scope of the invention.

What is claimed is:

1. A method of adapting a multivariable process model made up of two or more single-input single-output (SISO) models for use in a process controller that uses the multivariable process model to perform process control, the method comprising:

selecting a subset of the SISO models to adapt;
individually adapting each of the selected subset of the SISO models; and
providing the adapted subset of the SISO models to the process controller to be used in the multivariable process model.

2. The method of adapting a multivariable process model of claim 1, further including determining when to perform a model adaptation based on a change to a process input or a process output.

3. The method of adapting a multivariable process model of claim 2, wherein determining when to perform a model adaptation includes collecting and storing data indicative the process input or the process output and analyzing the collected data to detect a change in the process input or the process output greater than a predetermined amount.

4. The method of adapting a multivariable process model of claim 1, wherein selecting a subset of the SISO models includes analyzing one or more of the SISO models associated with an output of the process to determine a correlation measure between each of the one or more of the SISO models and the output of the process and selecting a SISO model to adapt based on the correlation measures.

5. The method of adapting a multivariable process model of claim 1, wherein selecting a subset of the SISO models includes determining, for each of a number of process inputs, a correlation measurement between the process input and an error measurement between a measured process output and a process output developed by the multivariable process model, using the correlation measurements to select one of the process inputs, and selecting one of the SISO models which relates the selected one of the process inputs to the measured process output as one of the subset of the SISO models.

6. The method of adapting a multivariable process model of claim 5, wherein using the correlation measurements to select one of the process inputs includes determining if a first one of the process inputs experienced a predetermined amount of change and selecting the first one of the process inputs as the selected one of the process inputs only if the first one of the process inputs experienced a predetermined amount of change.

7. The method of adapting a multivariable process model of claim 1, wherein selecting a subset of the SISO models includes determining which process inputs are most correlated with an error between a measured process output and a modeled process output developed by the multivariable process model and selecting one or more of the SISO models based on the correlation determination.

8. The method of adapting a multivariable process model of claim 1, wherein separately adapting each of the selected subset of the SISO models includes performing a model switching adaptation technique on at least one of selected subset of the SISO models.

9. The method of adapting a multivariable process model of claim 1, wherein separately adapting each of the selected subset of the SISO models includes performing an attribute interpolation adaptation technique on at least one of selected subset of the SISO models.

10. The method of adapting a multivariable process model of claim 1, further including validating the multivariable process model with the adapted subset of the SISO models prior to providing the adapted subset of the SISO models to the process controller to be used in the multivariable process model.

11. The method of adapting a multivariable process model of claim 10, wherein validating the multivariable process model with the adapted subset of the SISO models includes determining if the multivariable process model with the adapted subset of the SISO models has a lower modeling error than the multivariable process model without the adapted subset of the SISO models.

12. The method of adapting a multivariable process model of claim 10, wherein validating the multivariable process model with the adapted subset of the SISO models includes determining if the multivariable process model with the adapted subset of the SISO models operates on the same process input and process output data to provide better control than the multivariable process model without the adapted subset of the SISO models.

13. The method of adapting a multivariable process model of claim 1, further including transforming at least one of the adapted subset of the SISO models into a form used by the process controller prior to providing the adapted subset of the SISO models to the process controller to be used in the multivariable process model.

14. The method of adapting a multivariable process model of claim 1, wherein individually adapting each of the selected subset of the SISO models includes adapting a parameter based SISO model.

15. The method of adapting a multivariable process model of claim 14, wherein the parameter based SISO model is a first-order-plus-dead-time model.

16. The method of adapting a multivariable process model of claim 1, wherein individually adapting each of the selected subset of the SISO models includes adapting a non-parametric based SISO model.

17. The method of adapting a multivariable process model of claim 16, wherein the non-parametric based SISO model is one of a step response model and an impulse response model.

18. The method of adapting a multivariable process model of claim 16, wherein individually adapting each of the selected subset of the SISO models includes adjusting an attribute of the non-parametric based SISO model.

19. The method of adapting a multivariable process model of claim 18, wherein adjusting an attribute of the non-parametric based SISO model includes adjusting one of the time until a response is first observed, a scaling, and a slope of the non-parametric based SISO model.

20. A process control system for use in controlling a process, comprising:

a process controller including a multivariable process model made up of two or more single-input single-output (SISO) models for use in controlling the process; and
a model adaptation unit communicatively connected to the process controller, including;
a first unit for selecting a subset of the SISO models for adaptation;

a second unit for altering each of the selected subset of the SISO models; and a third unit for providing the altered subset of the SISO models to the process controller to be used in the multivariable process model.

21. The process control system of claim 20, wherein the model adaptation unit further includes a supervisor unit for detecting changes in one or more process inputs or process outputs to determine when to start an adaptation cycle.

22. The process control system of claim 21, wherein the supervisor unit includes a data collection unit, collects and stores data indicative of one of the one or more process inputs or process outputs in the data collection unit and analyzes the collected data to detect a change in the one of the one or more process inputs or process outputs greater than a predetermined amount.

23. The process control system of claim 21, wherein the first unit selects a subset of the SISO models by analyzing one or more of the SISO models associated with an output of the process to determine a correlation measure between an input of each of the one or more of the SISO models associated with the output of the process and the output of the process, and selects a SISO model to adapt based on the correlation measures.

24. The process control system of claim 20, wherein the first unit determines, for each of a number of process inputs, a correlation measurement between the process input and an error measurement between a measured process output and a process output developed by the multivariable process model, uses the correlation measurements to select one of the process inputs, and selects one of the SISO models which relates the selected one of the process inputs to the measured process output as one of the subset of the SISO models.

25. The process control system of claim 20, wherein the second unit performs a model switching model adaptation technique on at least one of selected subset of the SISO models.

26. The process control system of claim 20, wherein the second unit performs an attribute interpolation model adaptation technique on at least one of selected subset of the SISO models.

27. The process control system of claim 20, wherein the model adaptation unit further includes a validation unit adapted to test the multivariable process model using the altered subset of the SISO models prior to the third unit providing the altered subset of the SISO models to the process controller to be used in the multivariable process model.

28. The process control system of claim 27, wherein the model adaptation unit further includes a transformation unit for transforming at least one of the altered subset of the SISO models into a form used by the multivariable process model within the process controller prior to providing the altered subset of the SISO models to the process controller to be used in the multivariable process model.

29. The process control system of claim 20, wherein at least one of the selected subset of the SISO models is a parameter based SISO model.

30. The process control system of claim 29, wherein the parameter based SISO model is a first-order-plus-dead-time model.

31. The process control system of claim 20, wherein at least one of the selected subset of the SISO models is a non-parametric based SISO model.

32. The process control system of claim 31, wherein the non-parametric based SISO model is one of a step response model and an impulse response model.

33. The process control system of claim 31, wherein the second unit adjusts an attribute of the non-parametric based SISO model by adjusting one of the time until a response is first observed, a scaling, and a slope of the non-parametric based SISO model.

34. The process control system of claim 20, wherein the process controller is a model predictive control type controller.

35. A model adaptation unit for use in a process control system having a multivariable process model made up of two or more single-input single-output (SISO) models, the model adaptation unit comprising:

a computer readable medium;

a program stored on the computer readable medium and implemented on a processor, the program including;

a first routine configured to select a subset of the SISO models for adaptation;

a second routine configured to adapt each of the selected subset of the SISO models; and a third routine configured to provide the adapted subset of the SISO models to the multivariable process model.

36. The model adaptation unit of claim 35, wherein the program further includes a supervisor routine configured to detect a change in a process input or process output to determine when to start an adaptation cycle.

37. The model adaptation unit of claim 35, wherein the first routine determines, for each of a number of process inputs, a correlation measurement between the process input and an error measurement between a measured process output and a process output developed by the multivariable process model, uses the correlation measurements to select one of the process inputs, and selects one of the SISO models which relates the selected one of the process inputs to the measured process output as one of the subset of the SISO models.

38. The model adaptation unit of claim 35, wherein the second routine performs a model switching model adaptation technique on at least one of selected subset of the SISO models.

39. The model adaptation unit of claim 35, wherein the second routine performs an attribute interpolation model adaptation technique on at least one of selected subset of the SISO models.

40. The model adaptation unit of claim 35, wherein the program further includes a validation routine that tests the multivariable process model using the adapted subset of the SISO models prior to the third routine providing the adapted subset of the SISO models to the multivariable process model.

41. The model adaptation unit of claim 40, wherein the program further includes a transformation unit that transforms at least one of the adapted subset of the SISO models into a form used by the multivariable process model prior to the third routine providing the adapted subset of the SISO models to the multivariable process model.

42. The model adaptation unit of claim 35, wherein at least one of the selected subset of the SISO models is a non-parametric based SISO model and wherein the second unit adjusts an attribute of the non-parametric based SISO model by adjusting one of the time until a response is first observed, a scaling, and a slope of the non-parametric based SISO model.

* * * * *

UNITED STATES PATENT AND TRADEMARK OFFICE
CERTIFICATE OF CORRECTION

PATENT NO. : 7,317,953 B2
APPLICATION NO. : 11/002158
DATED : January 8, 2008
INVENTOR(S) : Wilhelm K. Wojsznis et al.

It is certified that error appears in the above-identified patent and that said Letters Patent is hereby corrected as shown below:

On Page 2:

Under item (56), Other Publications, 15th reference in right column, "ontrol" should be -- Control --.

At Column 7, line 16, "INi" should be -- $IN_i$ --.

At Column 9, line 19, "error-is" should be -- error is --.

Signed and Sealed this

Twenty-sixth Day of August, 2008

JON W. DUDAS
*Director of the United States Patent and Trademark Office*